United States Patent [19]
Ito

[11] Patent Number: 4,969,181
[45] Date of Patent: Nov. 6, 1990

[54] LOUDSPEAKER APPARATUS AND METHOD FOR A RADIO TELEPHONE APPARATUS

[75] Inventor: Koichi Ito, Hino, Japan

[73] Assignee: Kabushiki Kaisha Toshiba, Tokyo, Japan

[21] Appl. No.: 71,194

[22] Filed: Jul. 8, 1987

[30] Foreign Application Priority Data

Mar. 24, 1987 [JP] Japan .................................. 62-67813

[51] Int. Cl.⁵ .......................................... H04M 11/00
[52] U.S. Cl. ........................................ 379/61; 379/63
[58] Field of Search ................. 379/61, 62, 63, 388, 379/389, 390, 420, 387, 424

[56] References Cited

U.S. PATENT DOCUMENTS

| | | | |
|---|---|---|---|
| 4,309,573 | 1/1982 | Grantland et al. | 379/424 |
| 4,400,584 | 8/1983 | Vilmur | 379/61 |
| 4,639,550 | 1/1987 | Yamagawa et al. | 379/62 |
| 4,640,987 | 2/1987 | Tsukada et al. | 379/61 |
| 4,647,722 | 3/1987 | Nishida et al. | 379/388 |
| 4,756,021 | 7/1988 | Nakayama | 379/388 |

FOREIGN PATENT DOCUMENTS

0065542 4/1986 Japan ..................................... 379/61

*Primary Examiner*—Jin F. Ng
*Assistant Examiner*—Jhancy Augustus
*Attorney, Agent, or Firm*—Banner, Birch, McKie & Beckett

[57] ABSTRACT

A loudspeaker apparatus is used for a radio telephone apparatus having a base unit and a radio telephone set. The base unit includes a loudspeaker for generating a speech signal from a wired telephone line coupled to the base unit. The loudspeaker is connected to the wired telephone line in response to a calling origination signal by an operation of calling origination key if the radio telephone set is installed in the base unit.

20 Claims, 12 Drawing Sheets

LOUDSPEAKER APPARATUS AND METHOD FOR A RADIO TELEPHONE APPARATUS

BACKGROUND OF THE INVENTION

1. Field of Invention

This invention relates to the field of radio telephones typically cordless telephones and, more particularly, to an apparatus and method for enabling sounds to be heard from another telephone apparatus by means of a loudspeaker.

2. Description of the Prior Art

As is well known in the art, radio telephones, typically cordless telephones are comprised of a radio telephone set having a handset and a base unit connected to a wired telephone line for exchanging speech signals between the wired telephone line and the radio telephone set through a radio channel. The base unit and the radio telephone set are each provided with a pair of corresponding transmitters and receivers.

When a call signal arrives at the wired telephone line, the base unit transmits a paging signal to the radio telephone set through a predetermined control channel to form a speech channel. The paging signal includes a channel signal indicating one of a plurality of speech channels. Then, the radio telephone set starts an operation to send out a paging response signal through the control channel in response to the received paging signal. The base unit detects the intensity of the received paging response signal sent out from the radio telephone set, i.e., the intensity of the paging response signal at the control channel. Then, the base unit stops the transmission of the paging signal when the detected intensity exceeds a predetermined level and switches the radio channel between the base unit and the radio telephone set from the control channel to the speech channel indicated in the paging signal. The radio telephone set also switches the radio channel from the control channel to the speech channel by the received paging signal. Thereafter, the base unit transmits a ringing signal to the radio telephone set via the speech channel. After transmitting the ringing signal, the base unit establishes a speech path between the wired telephone line and the radio telephone set when it receives an "off-hook" signal from the radio telephone set indicating that the handset is "off the hook".

When the base unit is in a waiting state and receives a call origination signal (an off-hook signal) from the radio telephone set through the control channel, it determines the call origination request from the radio telephone set and transmits a response signal which includes the channel signal indicating one of the plurality of speech channels. Then, the base unit establishes a speech path between the wired telephone line and itself, and switches the radio channel from the control channel to the speech channel indicated in the response signal. After receiving the response signal, the radio telephone set also switches the radio channel from the control channel to the speech channel in response to the received response signal.

If, in this state, the radio telephone set transmits dialing signals to the base unit through the speech channel by a dialing operation, the dialing signal is transmitted to the wired telephone line via the base unit.

Thus, the radio telephone apparatus carries out the operations of receiving incoming telephone calls from the wired telephone line and originating calls from the radio telephone set.

However, the prior art radio telephones suffer a serious drawback in that a sufficiently large enough loudspeaker can not be adapted to be used in the apparatus because it is necessary for the radio telephone set to be compact and light. Even if a loudspeaker with a large enough speaker was adapted to be used in the apparatus, it is extremely difficult to drive the loudspeaker to generate speech signals because the capacity of the power source of the radio telephone set is not sufficient to drive the loudspeaker. Generally, the power source is a small storage battery used to drive the components of the radio telephone set. These components typically have low power requirements. Loudspeakers typically have high power requirements.

SUMMARY OF THE INVENTION

It is, therefore, an object of the present invention to provide a loudspeaker apparatus and method for use in a radio telephone apparatus, which apparatus and method is capable of producing speech signals from another telephone apparatus with a loudspeaker.

It is further object of the present invention to provide an apparatus capable of producing speech signals from another telephone apparatus with a loudspeaker, which apparatus is used in a radio telephone apparatus and adapted to be made compact and light.

According to this invention, and in order to overcome the aforestated drawbacks, there is provided a loudspeaker apparatus for use in a radio telephone apparatus having a base unit and a radio telephone set so that sound signals may be heard from a loudspeaker in the base unit. The base unit is coupled to a wired telephone line and connected to the radio telephone set through a radio channel. The base unit also operates by DC power converted from an AC source. The radio telephone set is powered by a small storage battery which may be charged by the DC power when the set is installed in or on the base unit. The radio telephone set also includes call origination keys, dialing keys, a microphone and speaker. The base unit includes a loudspeaker for generating sound signals from said wired telephone line and a control circuit. The control circuit determines the loudspeaker mode in response to the call origination signal by the operation of the call origination key if the radio telephone set is installed in the base unit. The loudspeaker mode is characterized by sound signals being reproduced through at least the loudspeaker of the base unit. The control circuit connects the loudspeaker to the wired telephone line if that loudspeaker mode is determined, so that the sound signals may be heard through the loudspeaker.

BRIEF DESCRIPTION OF THE DRAWINGS

The subject matter which is regarded as the invention is particularly pointed out and distinctly claimed in the claims of the specification. The invention, however, both as to organization and method of practice, together with further objects and advantages thereof, may be best understood by reference to the following detailed description of the invention taken in conjunction with the drawings in which:

DETAILED DESCRIPTION

Figure 1:
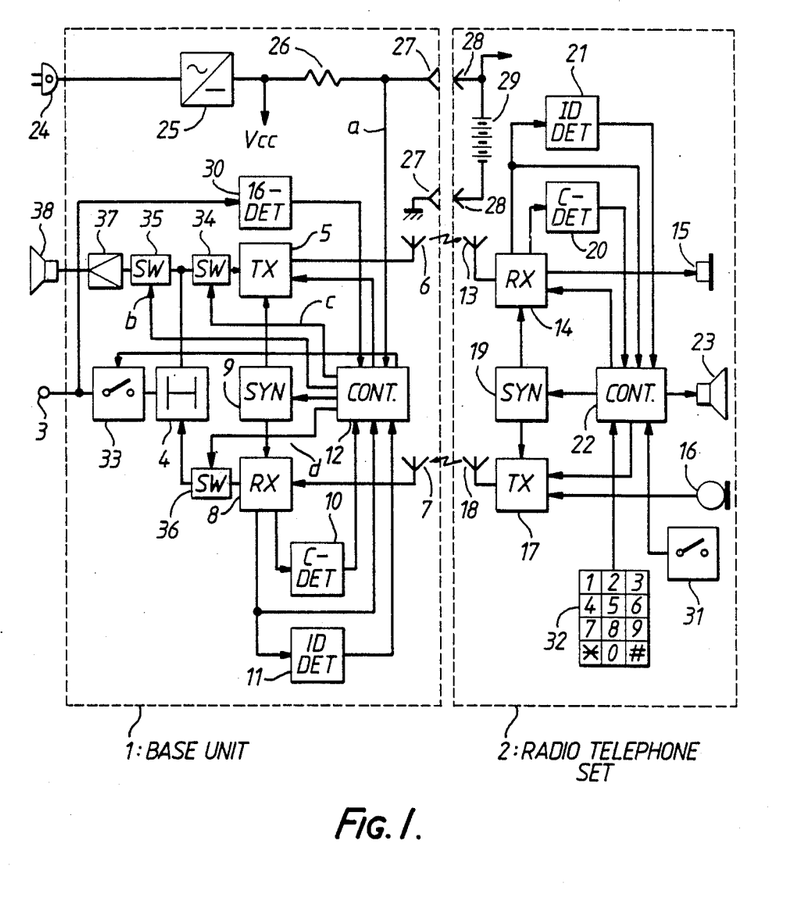
FIG. 1 shows a first embodiment of the present invention in block diagram form.
Figure 2:
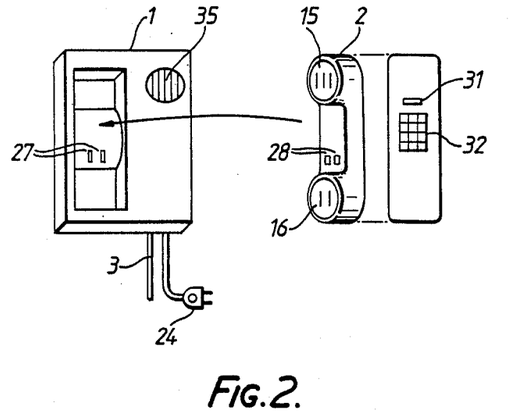
FIG. 2 is an external view of a radio telephone apparatus of FIG. 1.

In the embodiment shown in FIG. 1, base unit 1 is connected to a radio telephone set 2 through one of a plurality of radio channels including a control channel (C—CH) and a plurality of speech channels (S—CHs), and is also connected to a wired telephone line 3. Base unit 1 includes AC/DC converter 25 and AC plug 24, in order to produce a DC voltage (Vcc) from a commercial power source (AC power source). The DC voltage is supplied to the electrical components of base unit 1. Thus, base unit 1 is operated by the converted DC voltage. Radio telephone set 2 includes small storage battery 29 adapted to charge the DC voltage and supply the charged DC voltage to electrical components of itself. Both side terminals of battery 29 are connected to charging terminals 28. When radio telephone set 2 is installed in base unit 1, as shown in FIG. 2, charging terminals 28 are connected to supplying terminals 27 of base unit 1. Since one of terminals 27 is connected to AC/DC converter 25 through resistor 26 and another terminal 27 is connected to ground, the converted DC voltage is supplied to battery 29 through resistor 26 and terminals 27 and 28. Resistor 26 is a current limiting resistor to limit the current supplied to terminal 27.

A signal sent from wired telephone line 3 is applied to hybrid circuit 4 via line relay 33 when line relay 33 is closed (ON-state). Hybrid circuit 4 sends the applied signal to switches 34 and 35. Since switches 34 and 35 are always in a different switching state than each other, the signal from hybrid circuit 4 is supplied to transmitter 5 when switch 34 is closed or to loudspeaker 38 via amplifier 37 when switch 35 is closed. Transmitter 5 modulates a carrier wave according to the supplied signal and transmits the modulated signal to radio telephone set 2 via transmitting antenna 6. The carrier wave is supplied from synthesizer 9 and has frequency corresponding to radio channel selected in known manner by synthesizer 9.

A signal transmitted from radio telephone set 2 is received by receiving antenna 7 and demodulated by receiver 8 according to the carrier wave supplied from synthesizer 9. The demodulated signal is sent to hybrid circuit 4 when switch 36 is closed and then sent to wired telephone line 3 when line relay 33 is closed. The demodulated signal is also supplied to received field detector 10 and identification signal detector 11. Detector 10 is comprised of a carrier squelch circuit or a noise squelch circuit, and detects the intensity of the received field, while detector 11 determines whether the identification signal contained in the demodulated signal corresponds to a specific identification signal allocated to radio telephone set 2. The detected signals from detectors 10 and 11 are supplied to control circuit 12. The demodulated signal from receiver 8 is also supplied to control circuit 12 to record a control signal contained in the demodulated signal and adapted to establish a speech path.

The call signal detector 30 detects a call signal (16 Hz signal) sent from wired telephone line 3, and informs control circuit 12 that the call signal has been received.

Control circuit 12 includes a microcomputer, a RAM for storing data and a ROM containing a stored operations program. Control circuit 12 controls transmitter 5, synthesizer 9, line relay 33, switches 34, 35 and 36 (to establish a speech path in response to the output signals of receiver 8), and detectors 10, 11 and 30. Control circuit 12 also is connected to a connection point between resistor 26 and supplying terminal 27, and detects the voltage a at the connection point. The voltage a decreases when radio telephone set 2 is installed in base unit 1 because the charging current is supplied to battery 29 through terminals 27 and 28. Control circuit 12 determines that radio telephone set 2 is installed in base unit 1 if the voltage a is within a predetermined range and that radio telephone set 2 is not installed in the base unit 1 if the voltage is not within the predetermined range.

In radio telephone set 2, a signal transmitted from base unit 1 is received by receiving antenna 13, demodulated by receiver 14 and then applied to speaker 15. In the same manner as in base unit 1, the signal demodulated by receiver 14 is supplied to received signal detector 20, identification signal detector 21 and control circuit 22. A voice signal inputted into microphone 16 is supplied to the transmitter 17 as a modulation input and then transmitted to base unit 1 through transmitting antenna 18. Control circuit 22 includes a microcomputer, a RAM for storing data and a ROM containing a stored operations program. Control circuit 22 controls receiver 14, transmitter 17 and synthesizer 19 (to establish a speech path in response to the output signals of receiver 14), and detectors 20 and 21. Control circuit 22 also causes speaker 23 to produce a ringing sound when it determines that a ringing signal is received according to the demodulated signal from receiver 14. Speakers 15, 23 and microphone 16 are adapted to consume very little electricity. Control circuit 22 controls call origination operation in response to key data from calling origination key 31 and dialing key 32. Keys 31 and 32 are arranged on a top surface of radio telephone set 2, as shown in FIG. 2, so as to be able to operate when radio telephone set 2 is installed in base unit 1. Key 31 is a slide type key and key 32 is a push-type key.

Figure 3A:
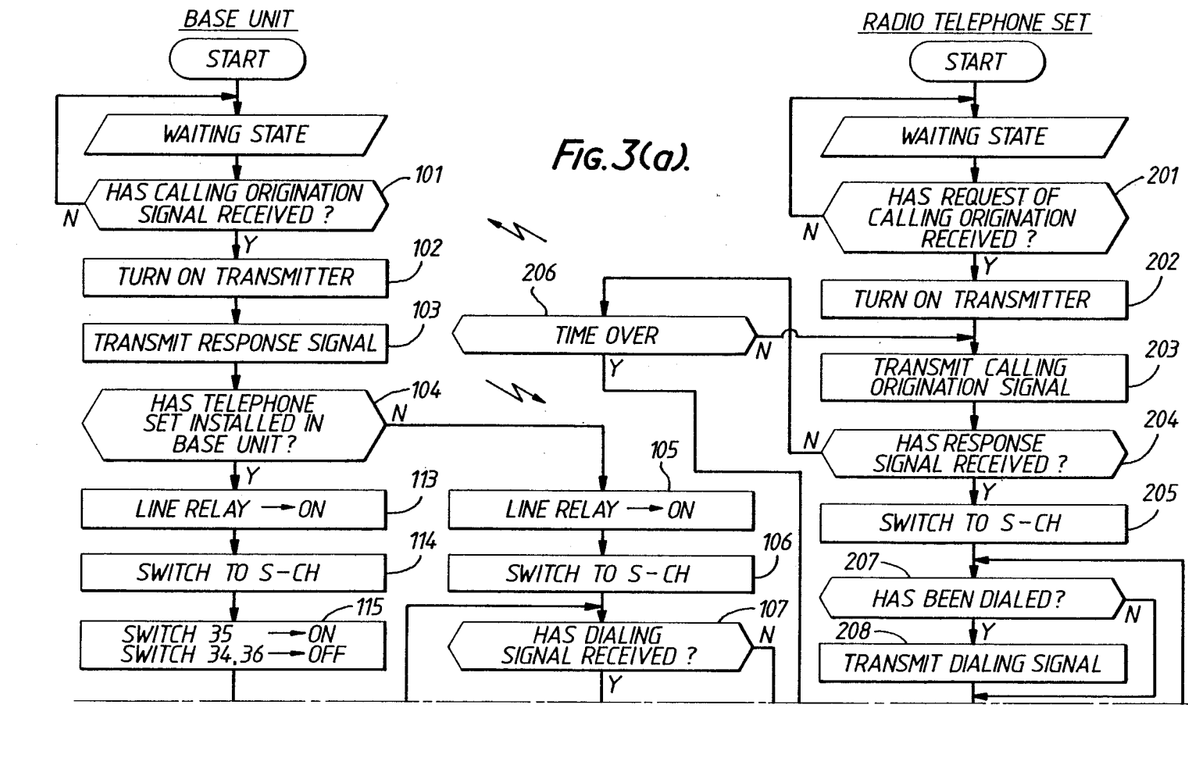
FIGS. 3a-3b shows a flow chart of a radio telephone apparatus of FIG. 1.
Figure 3B:
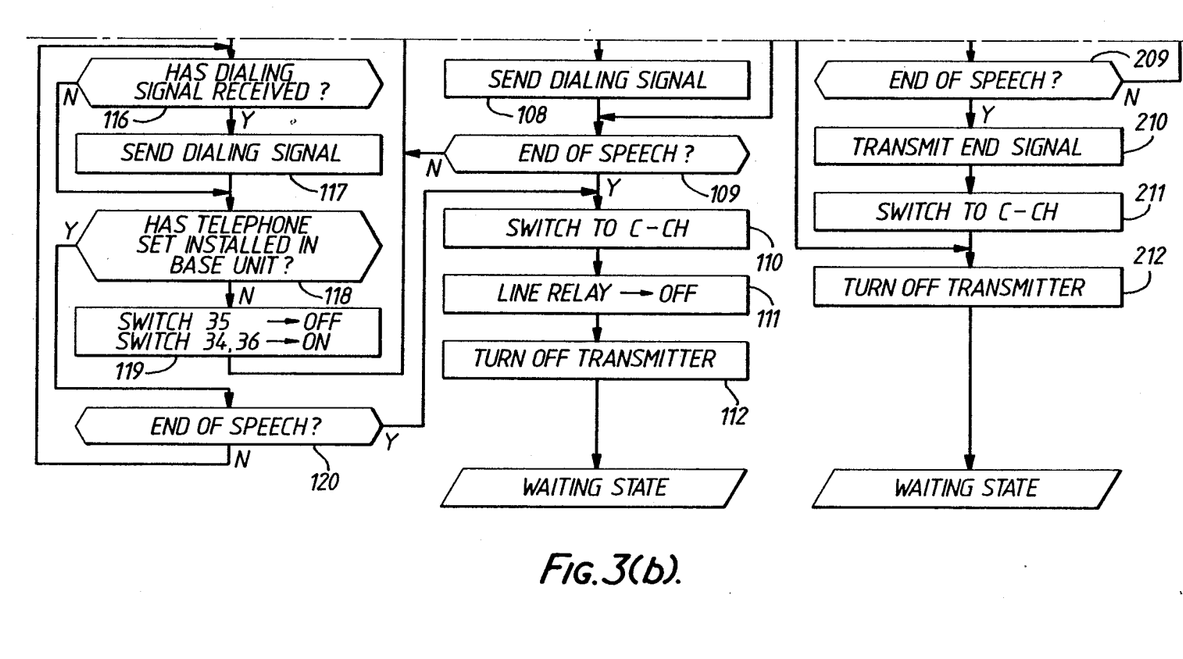

The operation of this embodiment is described with reference to the flow chart shown in FIG. 3 as follows.

In a waiting state, control circuit 12 causes transmitter 5 to turn off and control circuit 22 causes transmitter 17 to turn off, in order to prevent any unnecessary radio waves from radiating. Control circuit 22 further causes receiver 14 to turn on and off periodically to consume a minimal amount of electricity while in the waiting state. Also, in the waiting state switches 34 and 36 are in the ON-state (closed) and switch 35 is in the OFF-state (opened).

When call origination key 31 is slid to be in the ON-state, the key data is supplied to control circuit 22. Control circuit 22 determines that a request to originate a call has been made in response to the supplied key data, step 201, and causes transmitter 17 to turn on, step 202. Control circuit 22 then sends a call origination signal to transmitter 17 to modulate and transmit the call origination signal, step 203. In this state, synthesizer 19 supplies a carrier wave, corresponding to a control channel, to transmitter 17. After transmitting the call origination signal, control circuit 22 causes receiver 14 to turn on continuously.

The transmitted call origination signal is received and demodulated by receiver 8. The demodulated signal is supplied to control circuit 12. When it is determined that the demodulated signal is a call origination signal, step 101, control circuit 12 causes transmitter 5 to turn on, step 102. Control circuit 12 then sequentially switches the receiving channel to one of the plurality of speech channels to find a vacant speech channel. If control circuit 12 finds a vacant speech channel, it sends a response signal to transmitter 5 to modulate and transmit the response signal through the control channel, step 103. The response signal includes a speech channel signal indicating the vacant speech channel and a predetermined identification signal. Control circuit 12 then determines whether radio telephone set 2 is installed in base unit 1 according to the level of voltage a, step 104. If not, control circuit 12 determines a normal mode and sends a control signal to line relay 33 to connect wired telephone line 3 to hybrid circuit 4, step 105. Control circuit 12 sends a control signal to synthesizer 9 to switch the control channel to the selected vacant speech channel, step 106.

When receiver 14 receives the transmitted response signal, receiver 14 demodulates the signal and sends the demodulated signal to control circuit 22. When control circuit 22 determines the demodulated signal is the response signal, step 204, it sends a control signal to synthesizer 9 to switch the control channel to the indicated speech channel according to the speech channel signal in the response signal, step 205. In making this determination, control circuit 22 compares the identification signal in the response signal to its identification data. If control circuit 22 determines the identification signal doesn't correspond to its identification data, it doesn't respond to the demodulated signal. If the corresponding response signal is not received for a predetermined period, step 206, control circuit 22 annuls the received request for call origination and causes transmitter 17 to turn off, step 212. Control circuit 22 also causes receiver 14 to turn on and off periodically. Therefore, radio telephone set 2 is again in the waiting state.

When the speech channel between base unit 1 and radio telephone set 2 is established, a dial tone from wired telephone line 3 is transmitted to radio telephone set 2 and is generated by speaker 15. The dialing key 32 is depressed to transmit a dialing signal to base unit 1 after the dial tone is heard through speaker 15. Control circuit 22 receives the dialing key data from dialing key 32 and provides the data to transmitter 17, steps 207 and 208. Transmitter 17 modulates and transmits the dialing signal through the speech channel in response to the received data. When the dialing signal is received by receiver 8, receiver 8 demodulates the dialing signal and provides the demodulated dialing signal to control circuit 12. Control circuit 12 sends a dialing signal, such as a DTMF (dual tone multi-frequency) signal or a DP (dial pulse) signal, to wired telephone line 3, in response to the demodulated dialing signal, steps 107 and 108. Thus, the call origination operation is carried out and the radio telephone apparatus is placed in a communication state.

Thereafter, when call origination key 31 is slid to be in its initial position, control circuit 22 determines the end of speech and sends an end signal to transmitter 17 to transmit the end signal to base unit 1, steps 209 and 210. Control circuit 22 then sends a control signal to synthesizer 19 to switch the speech channel to the control channel, step 211, and causes transmitter 17 to turn off, step 212. Control circuit 22 also causes receiver 14 to turn on and off periodically. Therefore, radio telephone set 2 is in the waiting state again.

When the end signal is received by receiver 8, receiver 8 demodulates the end signal and sends the end signal to control circuit 12. Control circuit 12 sends a control signal to synthesizer 9 to switch the speech channel to the control channel in response to the received and demodulated end signal, steps 109 and 110. Control circuit 12 then sends control signals to line relay 33 and transmitter 5 to disconnect wired telephone line 3 from hybrid circuit 4 and turn off transmitter 5, steps 111 and 112. Therefore, base unit 1 is also in the waiting state again.

If control circuit 12 determines radio telephone set 2 is installed in base unit 1 at step 104, it determines a loudspeaker mode and sends a control signal to line relay 33 to connect wired telephone line 3 to hybrid circuit 4, step 113. Control circuit 12 also sends a control signal to synthesizer 9 to switch the control channel to the selected vacant speech channel, step 114. Then, control circuit 12 sends control signals b, c and d to switches 34, 35 and 36 to connect hybrid circuit 4 to amplifier 37 and disconnect hybrid circuit 4 from transmitter 5 and receiver 8, step 115. Therefore, the radio telephone apparatus is placed in a receiving loudspeaker mode with loudspeaker 38. In this state, since the dial tone from wired telephone line 3 is supplied to loudspeaker 38 through line relay 33, hybrid circuit 4, switch 35 and amplifier 37, the dial tone is generated by loudspeaker 38. Thereafter, control circuit 12 generates a dialing signal in response to the received dialing signal and sends the generated dialing signal to wired telephone line 3 when receiving dialing signal from radio telephone set 2, steps 116 and 117. After the call origination operation is carried out, a ringing signal from wired telephone line 3 is generated by loudspeaker 38 when the called telephone set is not busy. If the called party responds to this call, the responding voice signal from the called telephone set is generated by loudspeaker 38. When the called telephone set is busy, a busy tone from wired telephone line 3 is generated by loudspeaker 38. This receiving loudspeaker mode with loudspeaker 38 is continued while radio telephone set 2 is installed in base unit 1, step 118. In this state, when the end signal is received from radio telephone set 2, step 120, control circuit 12 carries out the end of speech operation as described above, steps 110, 111 and 112.

If the user picks up radio telephone set 2 after hearing the ringing signal or the response voice signal from loudspeaker 38, control circuit 12 determines radio telephone set 2 is not installed in base unit 1 according to the level of voltage a, step 118. Control circuit 12 then sends control signals b, c and d to switches 34, 35 and 36, in order to connect hybrid circuit 4 to transmitter 5 and receiver 8, and disconnect hybrid circuit 4 from amplifier 37. Therefore, the radio telephone apparatus is placed in the normal mode and uses speaker 15 and microphone 16 instead of the receiving loudspeaker mode.

Figure 4:
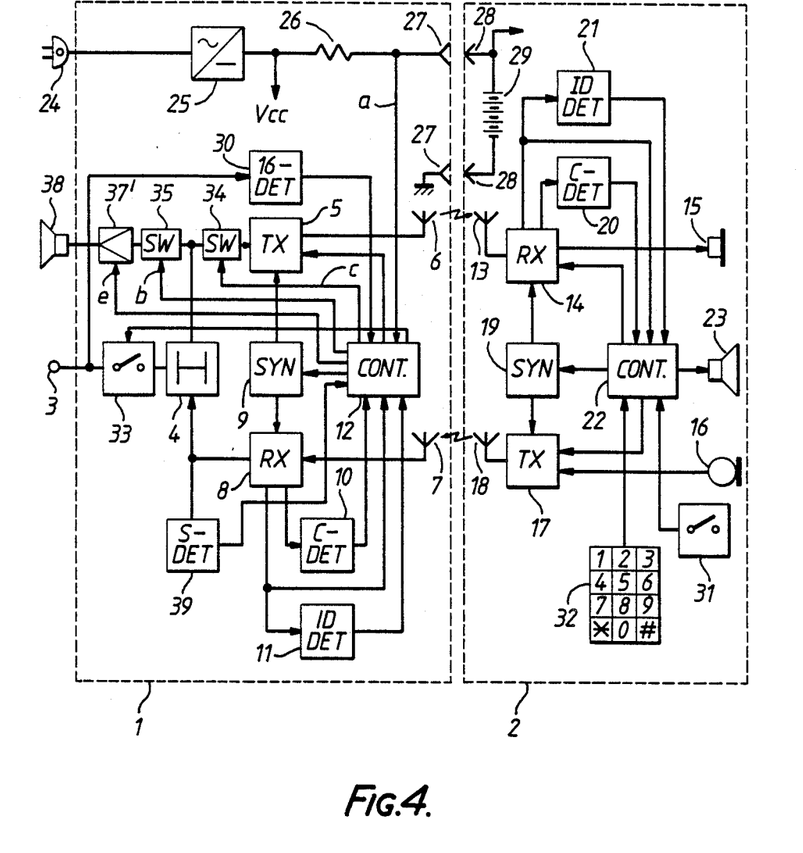
FIG. 4 shows a second embodiment of the present invention in block diagram form.

FIG. 4 illustrates the second embodiment of the invention. The difference between the second and first embodiments is that amplifier 37' is provided and is capable of selecting two kinds of gains. Signal level detector 39 is also provided. Also, in the second embodiment, switch 36 is eliminated. Signal level detector 39 detects the output signal from receiver 8 and determines whether the detected signal level is beyond a predetermined level. If so, detector 39 sends the detected signal to control circuit 12. Control circuit 12 sends a control signal e to amplifier 37' to reduce the gain of amplifier 37'. Since the gain of amplifier 37' is reduced when the magnitude of the output signal from receiver 8 is increased, the magnitude of the signal generated by loudspeaker 38 is reduced. As a result, the generated signal is prevented from entering microphone 16. According to this embodiment, the apparatus is able to carry out a loudspeaker communication with loudspeaker 38 and microphone 16, instead of only loudspeaker 38.

Figure 5A:
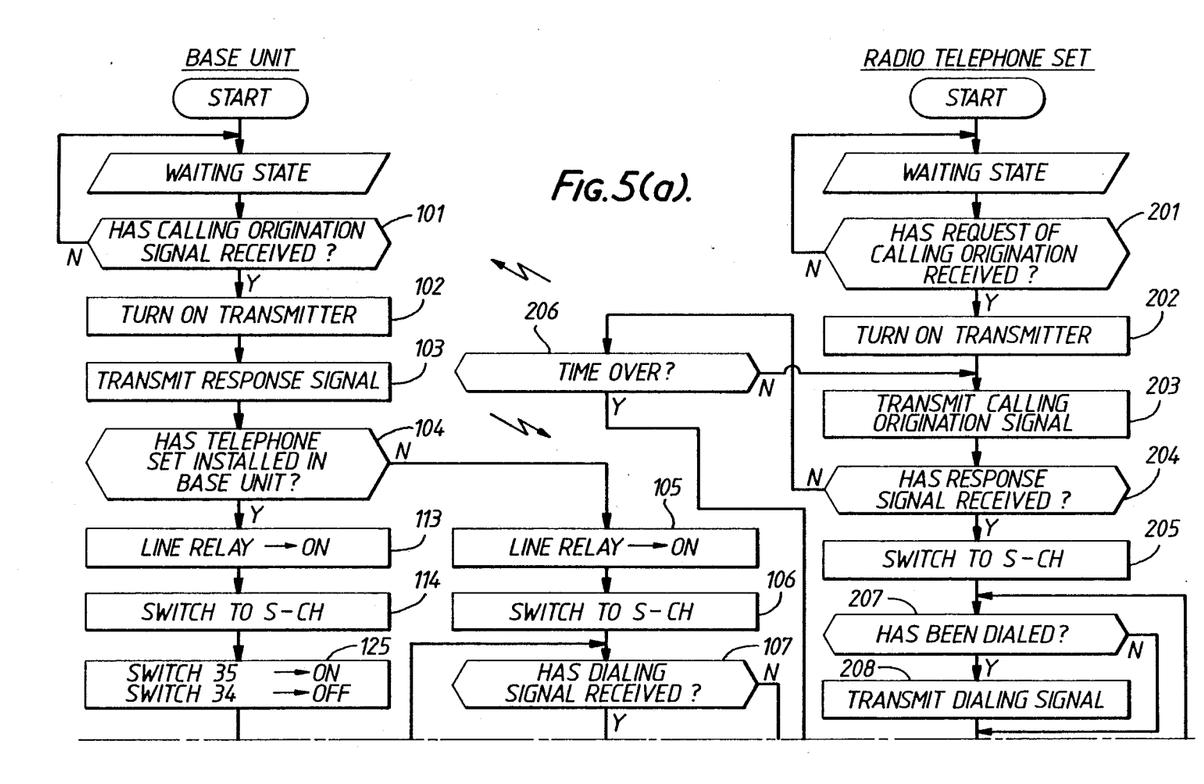
FIGS. 5a-5b shows a flow chart of a radio telephone apparatus of FIG. 4.
Figure 5B:
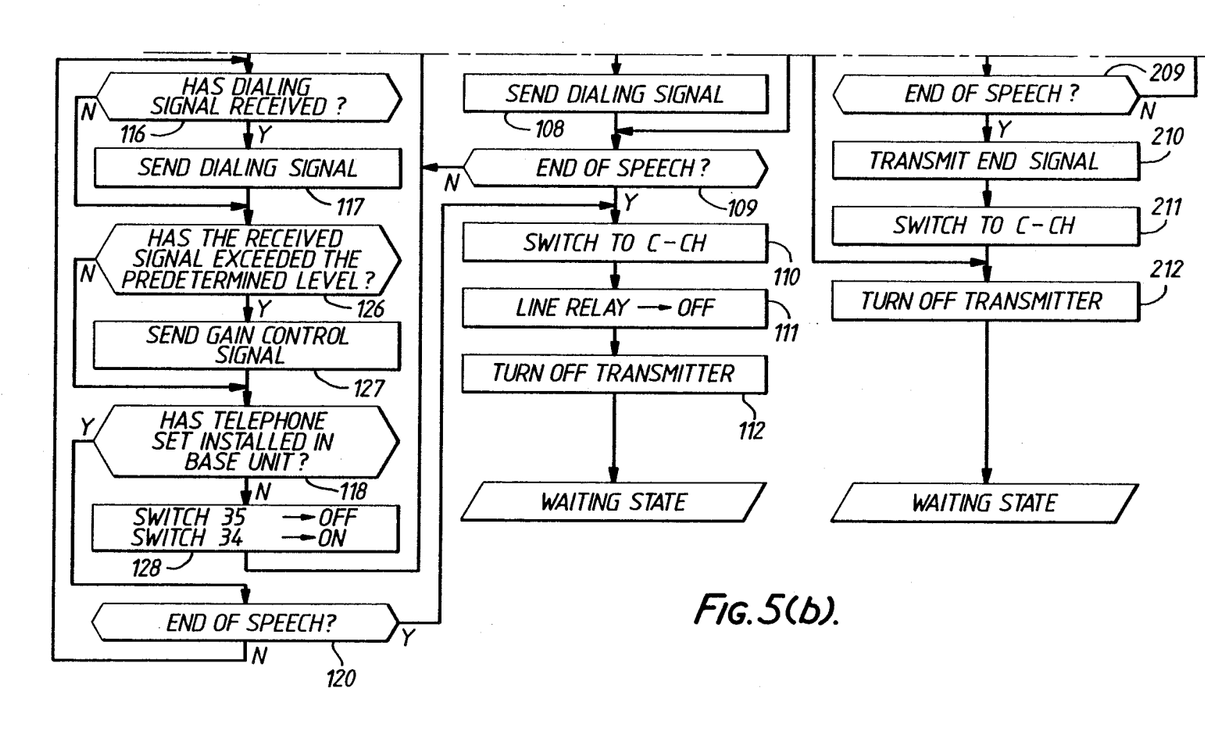

The operation of this embodiment is described with reference to the flow chart shown in FIG. 5 as follows. After transmitting the response signal to radio telephone set 2 in response to the calling origination signal, step 103, control circuit 12 determines whether radio telephone set 2 is installed in base unit 1, step 104. If so, control circuit 12 determines a loudspeaker communication mode and causes line relay 33 to connect hybrid circuit 4 to wired telephone line 3, step 113. Control circuit 12 then sends the control signal to synthesizer 9 to switch the control channel to the speech channel, step 114, and control signals b and c to switches 34 and 35 to connect hybrid circuit 4 to amplifier 37' and to disconnect hybrid circuit 4 from transmitter 5, step 125. Therefore, the radio telephone apparatus is in the loudspeaker communication mode with loudspeaker 38 and microphone 16. In this state, the dial tone from wired telephone line 3 is generated by loudspeaker 38 until control circuit 12 sends the dialing signal to wired telephone line 3. After the speech path between the called telephone set and base unit 1 is established according to the dialing signal, steps 116 and 117, control circuit 12 determines the output of detector 39. If control circuit 12 determines the detected signal from detector 39 is supplied, step 126, it sends the control signal e to amplifier 37' to reduce the gain, step 127. If control circuit 12 determines the detected signal is not supplied, step 126, it stops sending the control signal e to amplifier 37' to return it to the initial gain.

This loudspeaker communication mode is continued while radio telephone set 2 is installed in base unit 1, step 118. In this state, when the end signal is received from radio telephone set 2, step 120, control circuit 12 carries out the end operation as described in the above embodiment, steps 110, 111 and 112.

If the user picks up radio telephone set 2 in this loudspeaker communication mode, control circuit 12 sends control signals b and c to switches 34 and 35, in order to connect hybrid circuit 4 to transmitter 5 and disconnect hybrid circuit 4 from amplifier 37', step 128. Therefore, the radio telephone apparatus is returned to the normal mode with speaker 15 and microphone 16 instead of the loudspeaker communication mode.

Figure 6:
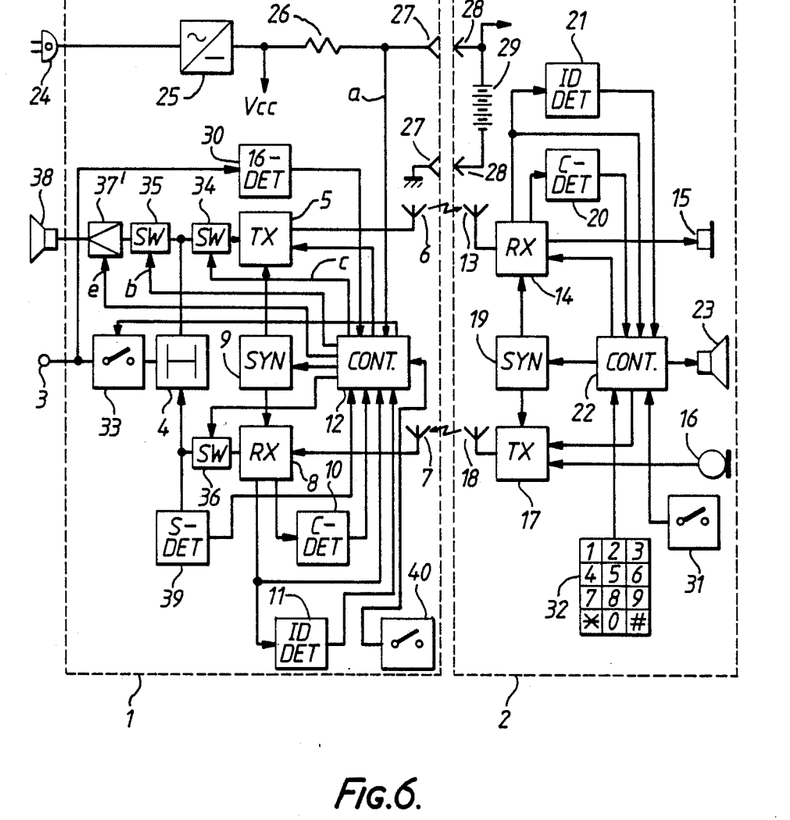
FIG. 6 shows a third embodiment of the present invention in block diagram form.
Figure 7:
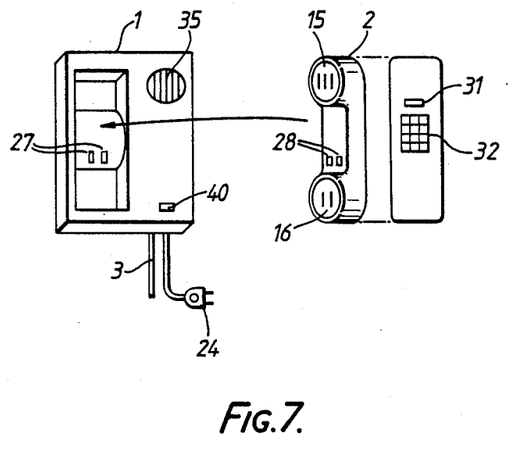
FIG. 7 is an external view of a radio telephone apparatus of FIG. 6.

FIG. 6 illustrates the third embodiment of the invention. In this embodiment, not only is the receiving loudspeaker operation carried out as described above first embodiment, but the loudspeaker communication is carried out as described above in the second embodiment. Also, in this embodiment, loudspeaker switch 40 is arranged on the top surface of base unit 1 as shown in FIG. 7. The operation of this embodiment is described with reference to the flow chart shown in FIGS. 8 and 9 as follows.

Figure 8A:
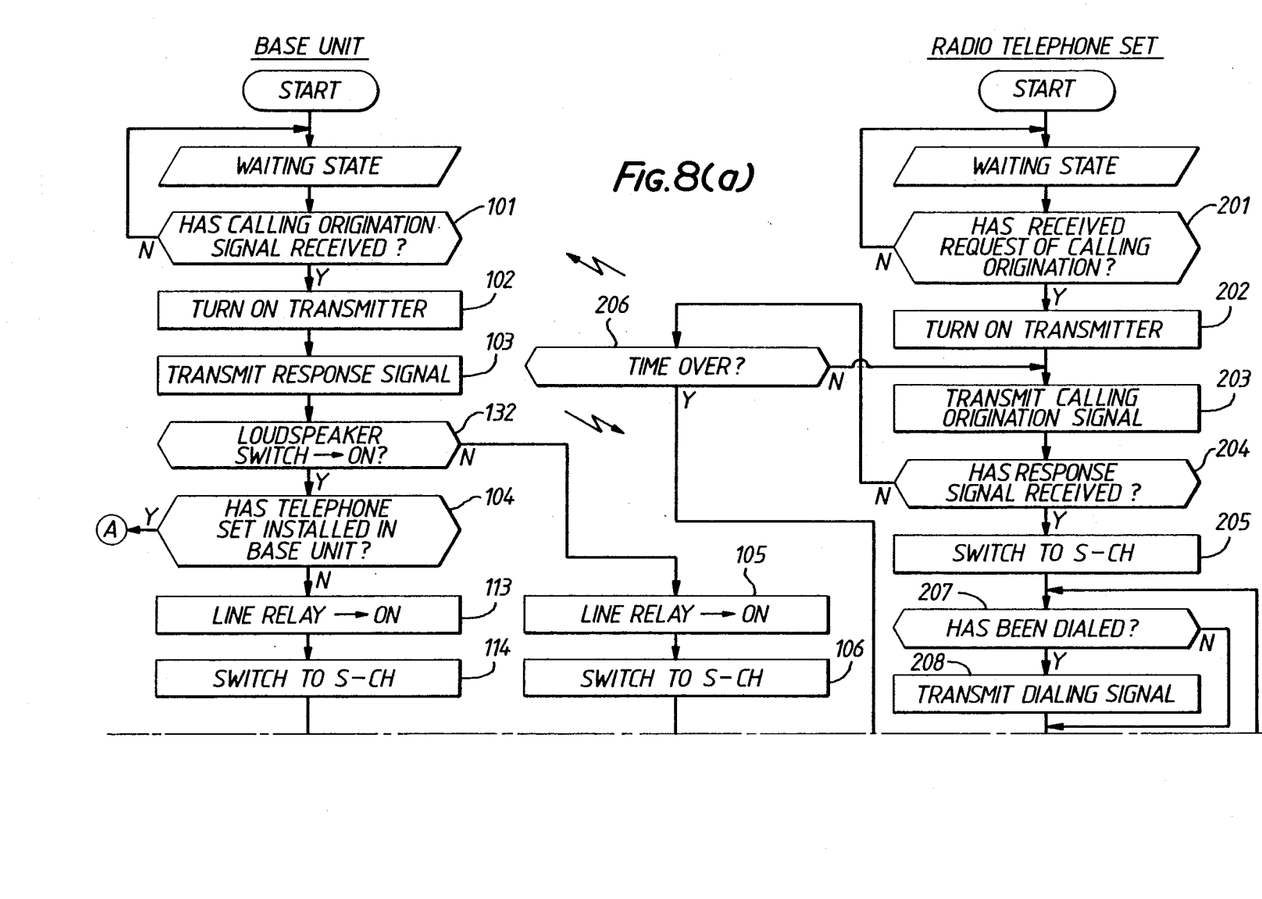
FIGS. 8a-8b to 10 show flow charts of a radio telephone apparatus of FIG. 6.
Figure 8B:
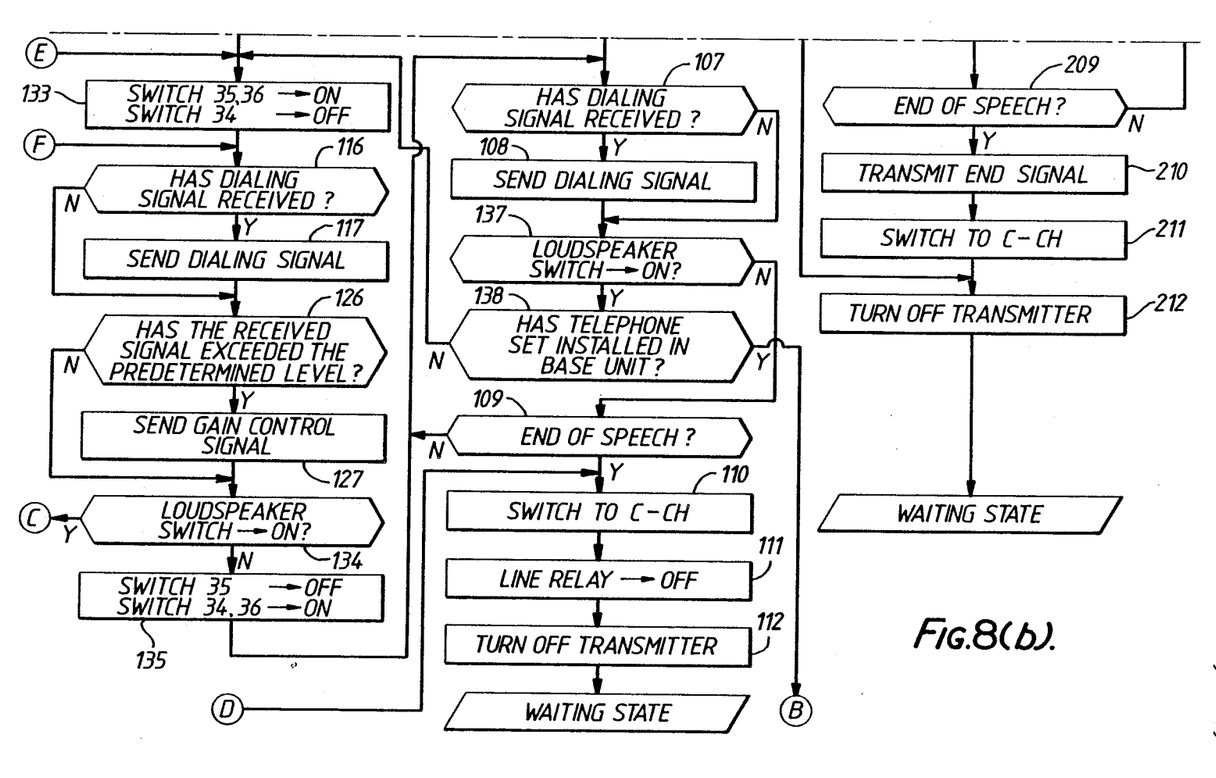
Figure 9:
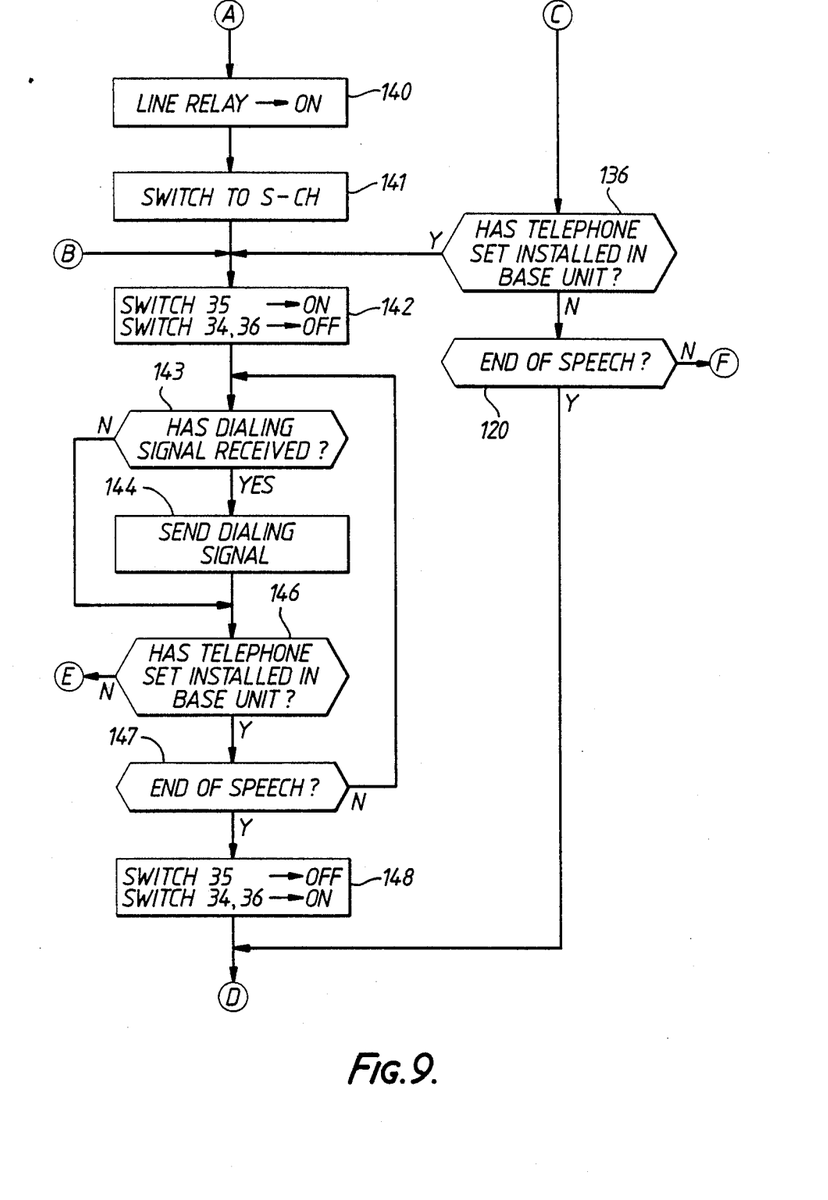

After transmitting the response signal to radio telephone set 2 in response to the calling origination signal, step 103, control circuit 12 determines whether loudspeaker switch 40 is depressed, step 132. If so, control circuit 12 further determines whether radio telephone set 2 is installed in base unit 1, step 104. If not, control circuit 12 sends control signals b, c and d to switches 34, 35 and 36, in order to connect hybrid circuit 4 to receiver 8 and amplifier 37', and disconnect hybrid circuit 4 from transmitter 5, step 133. Therefore, the loudspeaker communication is carried out with loudspeaker 38 and microphone 16 after the speech path between the called telephone set and base unit 1 is established. Thereafter, when loudspeaker switch 40 is depressed and is in the OFF-state, step 134, control circuit 12 sends controls signals b, c and d to switches 34, 35 and 36, in order to disconnect hybrid circuit 4 from amplifier 37' and connect hybrid circuit 4 to transmitter 5 and receiver 8, step 135. Therefore, the radio telephone apparatus is placed in the normal mode with speaker 15 and microphone 16.

If control circuit 12 determines radio telephone set 2 is installed in base unit 1 in step 104, it causes line relay 33 to connect wired telephone line 3 to hybrid circuit 4 and syntehsizer 9 to switch the control channel to the speech channel, steps 140 and 141. Control circuit 12 then sends control signals b, c and d to switches 34, 35 and 36, in order to connect hybrid circuit 4 to amplifier 37' and disconnect hybrid circuit 4 from transmitter 5 and receiver 8, step 142. Thus, the receiving loudspeaker operation is carried out. In this state, control circuit 12 always causes amplifier 37' to select higher gain by the control signal e. When control circuit 12 determines radio telephone set 2 is not installed in base unit 1 in the receiving loudspeaker operation, step 146, control circuit 12 sends control signals b, c and d to switches 34, 35 and 36, in order to disconnect hybrid circuit 4 from transmitter 5 and connect hybrid circuit 4 to receiver 8 and amplifier 38, step 133. The radio telephone apparatus is placed in the loudspeaker communication mode with loudspeaker 38 and microphone 16. When control circuit 12 also receives the end signal from radio telephone set 2 in the receiving loudspeaker operation, step 147, it sends control signals b, c and d to the switches, in order to disconnect hybrid circuit 4 from amplifier 37' and connect hybrid circuit 4 to transmitter 5 and receiver 8, step 148. Thereafter, control circuit 12 carries out the end operation as described above, steps 110, 111 and 112.

According to this embodiment, when loudspeaker switch 40 is in the ON-state and radio telephone set 2 is installed in base unit 1, in the normal mode, steps 137 and 138, the radio telephone apparatus is placed in the receiving loudspeaker mode. Also, when loudspeaker switch 40 is in the ON-state and radio telephone set 2 is not installed in base unit 1, in the normal mode, steps 137 and 138, the radio telephone apparatus is placed in the loudspeaker communication mode. Furthermore, when radio telephone set 2 is installed in base unit 1, in the loudspeaker communication mode, step 136, the radio telephone apparatus is placed in the receiving loudspeaker mode.

Figure 10:
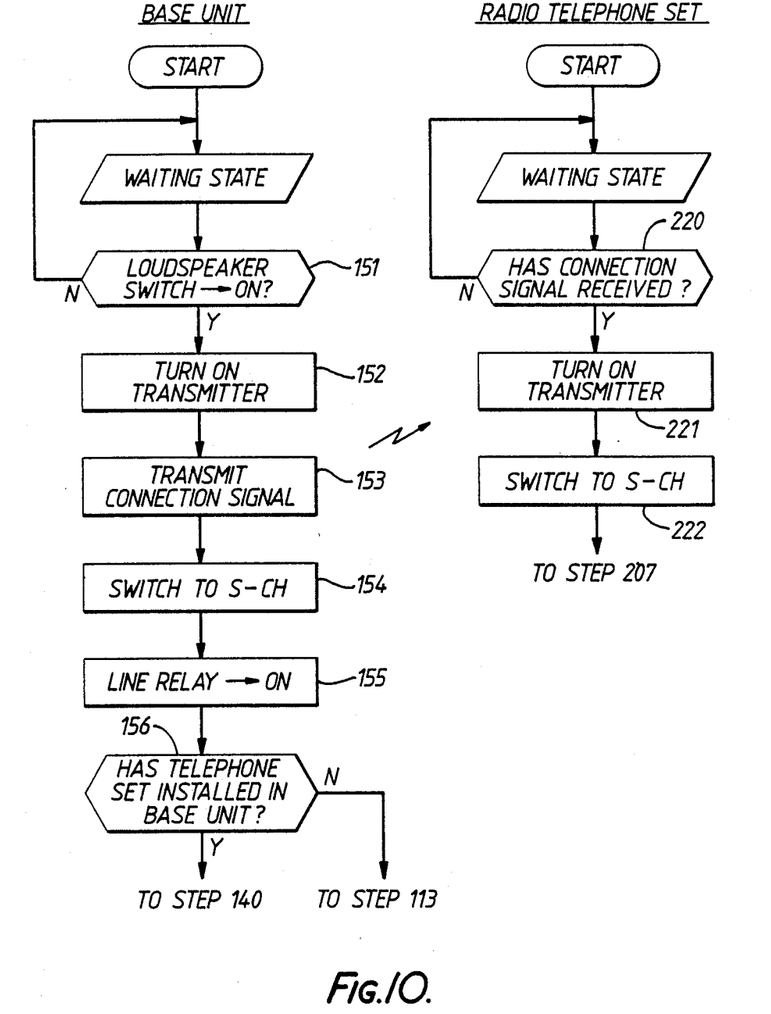

FIG. 10 shows another operation of the third embodiment described in FIG. 6. According to this embodiment, the apparatus is able to operate the calling origination in response to the depression of loudspeaker switch 40, instead of the operation of calling origination key 31.

When control circuit 12 determines loudspeaker switch 40 is in the ON-state by being depressed in the waiting state, step 151, it sends a connection signal to transmitter 5 after transmitter 5 is turned on, steps 152 and 153. Transmitter 5 transmits the connection signal to radio telephone set 2 through the control channel. The connection signal includes the speech channel signal indicating the found vacant speech channel and the predetermined identification signed.

Control circuit 12 then sends the control signals to synthesizer 9 and line relay 33 to select the vacant speech channel and connect hybrid circuit 4 to wired telephone line 3, steps 154 and 155. Thereafter, control circuit 12 determines whether radio telephone set 2 is installed in base unit 1, step 156. If so, the radio telephone apparatus is placed in the receiving loudspeaker mode, and if not, it is placed in the loudspeaker communication mode, as described above.

On the other hand, when control circuit 22 determines the connection signal is received, step 220, it sends the control signal to synthesizer 19 to select the indicated speech channel after transmitter 17 is turned on, steps 221 and 222. Thus, the speech path between base unit 1 and radio telephone set 2 is established.

In the preferred embodiments, the end operation is carried out by operation of key 31. However, base unit 1 may detect the fact that the called telephone set is disconnected from wired telephone line according to the end operation and carry out the end operation, as well known in the art.

Also, in the above-described embodiments, signal level detector 39 determines whether the output signal level from receiver 8 is beyond one predetermined level and amplifier 37' selects one of two gains by the control signal e from control circuit 12. However, detector 39 may compare the output signal level with a plurality of predetermined levels and amplifier 37' may select one of a plurality of gains according to the signal level determined by detector 39.

Further, in the above-described embodiments, control circuit 12 determines whether radio telephone set 2 is installed in base unit 1 according to the voltage a corresponding to the charging current. However, control circuit 12 may determine the installed state according to the particular switch arranged on base unit 1. The particular switch may be in particular switching state such as the ON-state when radio telephone set 1 is installed in base unit 1. Furthermore, transmitters 5 and 17 may reduce the transmitting power when radio telephone set 2 is installed in base unit 1 to reduce the consumption of the current. Also, control circuit 12 may send a dialing signal to control circuit 12 through the charging line including terminals 27 and 28 when radio telephone set 2 is installed in base unit 1.

While the invention has been described herein by reference to several preferred embodiments, various modifications can be made without departing from the true scope and spirit of the invention. It is my intention, therefore, by the appended claims, to embody all such modifications.

I claim:

1. A loudspeaker apparatus for a radio telephone apparatus having a base unit coupled to a wired telephone line and a radio telephone set including a battery, wherein said radio telephone set is connected to said base unit through a radio channel, said loudspeaker apparatus comprising:

call origination means for generating a call origination signal;

loudspeaker means provided in said base unit for generating a speech signal from said wired telephone line;

mode means provided in said base unit for determining at least a first loudspeaker mode characterized by transducing a speech signal with said loudspeaker means; and speech control means provided in said base unit for connecting said loudspeaker means to said wired telephone line in response to the call origination signal from said call origination means if said first loudspeaker mode is determined by said mode means;

wherein said mode means comprises:

determining means for determining if said radio telephone set is installed in said base unit; and control means responsive to said determining means and said call origination signal for enabling said loudspeaker means and disabling a speaker means in said handset if said radio telephone set is installed on said base unit and enabling said speaker means in said handset and disabling said loudspeaker means if said handset is not installed on said base unit.

2. The apparatus of claim 1, wherein said first determining means is means for determining if said radio telephone set is installed in said base unit in response to a charging current supplied from a power source of said base unit to said battery of said radio telephone set.

3. The apparatus of claim 1 wherein said call origination means is provided in said radio telephone apparatus means and transmits the call origination signal to said base unit through the radio channel.

4. The apparatus of claim 1 wherein said call origination means is provided in said base unit.

5. The apparatus of claim 1 wherein said speech control means further connects said wired telephone line to a microphone of said radio telephone set.

6. The apparatus of claim 5 further comprising gain control means for adjusting the magnitude of the speech signal generated by said loudspeaker means in response to the magnitude of the speech signal from said microphone.

7. A loudspeaker apparatus for a radio telephone apparatus having a base unit coupled to a wired telephone line and a radio telephone set including a battery, wherein said radio telephone set is connected to said base unit through a radio channel, said loudspeaker apparatus comprising:

call origination means for generating a call origination signal;

loudspeaker means provided in said base unit for generating a speech signal from said wired telephone line;

mode means provided in said base unit for determining at least a first loudspeaker mode characterized by transducing a speech signal with said loudspeaker means; and speech control means provided in said base unit for connecting said loudspeaker means to said wired telephone line in response to the call origination signal from said call origination means if said first loudspeaker mode is determined by said mode means;

wherein said mode means comprises:

first determining means for determining if said radio telephone set is installed in said base unit; and second determining means for determining said first loudspeaker mode and a second loudspeaker mode in response to the call origination signal, an output signal from said first determining means and key data from a particular key, the first loudspeaker mode being characterized by transducing a speech signal with said loudspeaker means, the second loudspeaker mode being characterized by transducing a speech signal with said loudspeaker means and a microphone of said radio telephone set, and wherein said speech control means comprises means for connecting said loudspeaker means to said wired telephone line if the first loudspeaker mode is determined and connecting said loudspeaker means and said microphone to said wired telephone line if the second loudspeaker mode is determined.

8. The apparatus of claim 7 wherein said first determining means is means for determining said radio telephone set is installed in said base unit in response to a charging current supplied from a power source of said base unit to said battery of said radio telephone set.

9. The apparatus of claim 7 further comprising gain control means for adjusting the magnitude of the speech signal generated by said loudspeaker means in response to the magnitude of the speech signal from said microphone.

10. The apparatus of claim 7 wherein said particular key is provided in said base unit.

11. In a radio telephone apparatus having a base unit coupled to a wired telephone line and a radio telephone set including a battery, said radio telephone set being connected to said unit through a radio channel, a method for implementing loudspeaker mode selection comprising the steps of:
(a) generating a call origination signal;
(b) determining a loudspeaker mode characterized by transducing a speech signal using at least loudspeaker means provided in said base unit; and
(c) connecting said loudspeaker means to said wired telephone line in response to the call origination signal if the loudspeaker mode is determined;
wherein steps (b) and (c), respectively further comprise the steps of:
determining if said radio telephone set is installed in said base unit, and enabling said loudspeaker means and disabling a speaker means in said handset in response to the call origination signal and a determination that said radio telephone set is installed in said base unit and enabling said speaker means in said handset and disabling said loudspeaker means in response to the call origination signal and a determination that said radio telephone set is not installed in said base unit.

12. The method of claim 11 wherein the step of determining if said radio telephone set is installed in said base unit comprises determining a charging current supplied from a power source of said base unit to said battery of said radio telephone set.

13. The method of claim 11 further comprising the step of connecting said wired telephone line to a microphone of said radio telephone set.

14. The method of claim 13 further comprising the step of adjusting the magnitude of the speech signal generated by said loudspeaker means in response to the magnitude of the speech signal from said microphone.

15. In a radio telephone apparatus having a base unit coupled to a wired telephone line and a radio telephone set including a battery, said radio telephone set being connected to said unit through a radio channel, a method for implementing loudspeaker mode selection comprising the steps of:
(a) generating a call origination signal;
(b) determining a loudspeaker mode characterized by transducing a speech signal using at least loudspeaker means provided in said base unit; and
(c) connecting said loudspeaker means to said wired telephone line in response to the call origination signal if the loudspeaker mode is determined;
wherein step (b), determining the loudspeaker mode, comprises the steps of:
determining if said radio telephone set is installed in said base unit and generating a determination signal, and
determining a first loudspeaker mode and a second loudspeaker mode in response to the call origination signal, the determination signal and key data from a particular key;
wherein the first loudspeaker mode is characterized by transducing a speech signal using at least said loudspeaker means, the second loudspeaker mode is characterized by transducing a speech signal using at least said loudspeaker means and the microphone of said radio telephone set; and
wherein step (c), connecting said loudspeaker means, comprises the steps of:
connecting said loudspeaker means to said wired telephone line if the first loudspeaker mode is determined, and connecting said loudspeaker means and said microphone to said wired telephone line if the second loudspeaker mode is determined.

16. The method of claim 15 wherein the step of determining said radio telephone set is installed in said base unit comprises determining a charging current supplied from a power source of said base unit to said battery of said radio telephone set.

17. The method of claim 15 further comprising the step of adjusting the magnitude of the speech signal generated by said loudspeaker means in response to the magnitude of the speech signal from said microphone.

18. A radio telephone apparatus having a base unit coupled to a wired telephone line and a radio telephone set coupled to said base unit through a radio channel, wherein said base unit operates by a AC power source, and said radio telephone set operates by a battery, said apparatus comprising:
call origination means for generating a call origination signal;
loudspeaker means, powered by said AC power source, for generating a speech signal from said wired telephone line;
mode means provided in said base unit for determining a loudspeaker mode characterized by-transducing a speech signal using at least said loudspeaker means; and
speech control means provided in said base unit for connecting said loudspeaker means to said wired telephone line in response to the call origination signal from said call origination means if the loudspeaker mode is determined by said mode means;
wherein said mode means comprises:
determining means for determining if said radio telephone set is installed in said base unit; and
control means for determining the loudspeaker mode in response to (1) the call origination signal and (2) a determination that said radio telephone set is installed in said base unit, wherein said loudspeaker means is enabled and a speaker means in said radio telephone set is disabled.

19. The apparatus of claim 18, wherein said loudspeaker means is provided in said base unit.

20. The apparatus of claim 18 wherein said speech control means further connects said wired telephone line to a microphone powered by said battery.

* * * * *